United States Patent
Whittenberger et al.

(10) Patent No.: US 9,901,905 B2
(45) Date of Patent: Feb. 27, 2018

(54) MONOLITH WITH CATALYTIC OR SORBENT BEADS

(75) Inventors: William A. Whittenberger, Leavittsburg, OH (US); Lorne W. Deyoung, Southington, OH (US); Todd A. Romesberg, Vienna, OH (US); David A. Becker, Hiram, OH (US); Snezana Aleksic, Pittsburgh, PA (US)

(73) Assignee: Johnson Matthey Public Limited Company, London (GB)

( * ) Notice: Subject to any disclaimer, the term of this patent is extended or adjusted under 35 U.S.C. 154(b) by 582 days.

(21) Appl. No.: 13/342,517

(22) Filed: Jan. 3, 2012

(65) Prior Publication Data

US 2013/0171404 A1    Jul. 4, 2013

(51) Int. Cl.

| | | |
|---|---|---|
| *B01J 8/00* | (2006.01) | |
| *B01J 19/00* | (2006.01) | |
| *B01J 19/24* | (2006.01) | |
| *B01J 20/00* | (2006.01) | |
| *B01J 20/06* | (2006.01) | |

(Continued)

(52) U.S. Cl.
CPC ..... *B01J 20/3223* (2013.01); *B01J 20/28004* (2013.01); *B01J 20/2804* (2013.01); *B01J 20/28035* (2013.01); *B01J 20/28042* (2013.01); *B01J 20/3295* (2013.01); *B01J 35/04* (2013.01); *B01J 23/38* (2013.01); *B01J 23/70* (2013.01); *B01J 29/06* (2013.01); *Y10T 428/23* (2015.01); *Y10T 428/24628* (2015.01)

(58) Field of Classification Search
CPC .... B01J 19/00; B01J 19/0093; B01J 19/2485; B01J 19/249; B01J 7/00; B01J 8/00; B01J 35/023; B01J 35/04; B01J 2523/00; B01J 2523/51; B01J 2523/54; B01J 2523/68; B01J 2523/69; B01J 2523/842; B01J 2219/2479; B01J 20/06; B01J 20/3204; B01J 20/30; B01J 20/32; B01J 20/3214; B01J 20/3223; B01J 20/3236; B01J 20/28004; B01J 19/24; B01J 20/28; B01J 35/00; B01J 35/02; B01D 3/009; B01D 53/02; B01D 3/00; B01D 53/00
USPC .......... 422/129, 187, 211, 222; 428/68, 174; 502/100, 400
See application file for complete search history.

(56) References Cited

U.S. PATENT DOCUMENTS

| | | | | |
|---|---|---|---|---|
| 4,215,011 A | * | 7/1980 | Smith, Jr. | ..................... 422/211 |
| 4,271,044 A | * | 6/1981 | Fratzer et al. | ................ 502/304 |

(Continued)

FOREIGN PATENT DOCUMENTS

EP        885653 A2 * 12/1998

OTHER PUBLICATIONS

Machine translation of EP 885653 A2, which was published Dec. 23, 1998.*

(Continued)

*Primary Examiner* — Natasha Young
(74) *Attorney, Agent, or Firm* — Kevin M. Carroll; Pearne & Gordon LLP

(57) ABSTRACT

A monolith for catalytic or sorbent purposes. The monolith includes a substrate sheet having attached thereto a plurality of catalytic or sorbent beads. Each bead has a diameter of at least fifty microns. The substrate sheet at least partially defines one or more channels through the monolith. Fluid flowing through the channels will contact the beads for catalytic or sorbent purposes.

24 Claims, 5 Drawing Sheets

(51) Int. Cl.
    *B01J 20/28*     (2006.01)
    *B01J 20/30*     (2006.01)
    *B01J 20/32*     (2006.01)
    *B01J 35/00*     (2006.01)
    *B01J 35/02*     (2006.01)
    *B01J 35/04*     (2006.01)
    *B01D 3/00*     (2006.01)
    *B01D 53/00*     (2006.01)
    *B01D 53/02*     (2006.01)
    *B01J 23/38*     (2006.01)
    *B01J 23/70*     (2006.01)
    *B01J 29/06*     (2006.01)

(56) References Cited

U.S. PATENT DOCUMENTS

| | | |
|---|---|---|
| 4,471,014 A | 9/1984 | den Hartog et al. |
| 5,446,003 A * | 8/1995 | Augustine et al. ........... 502/159 |
| 6,334,769 B1 | 1/2002 | Retallick et al. |
| 6,409,801 B1 | 6/2002 | Shen et al. |
| 6,436,173 B1 | 8/2002 | Jale et al. |
| 6,461,412 B1 | 10/2002 | Jale et al. |
| 6,670,305 B2 | 12/2003 | Bae et al. |
| 6,764,755 B2 | 7/2004 | Tom et al. |
| 7,077,999 B2 | 7/2006 | Whittenberger |
| 7,090,487 B2 | 8/2006 | Whittenberger |
| 7,320,778 B2 | 1/2008 | Whittenberger |
| 7,472,936 B2 | 1/2009 | Whittenberger et al. |
| 7,501,102 B2 | 3/2009 | Whittenberger et al. |
| 7,565,743 B2 | 7/2009 | Whittenberger et al. |
| 7,682,580 B2 | 3/2010 | Whittenberger et al. |
| 7,906,079 B2 | 3/2011 | Whittenberger et al. |
| 2002/0169077 A1 | 11/2002 | Bae et al. |
| 2003/0113538 A1 | 6/2003 | Tom et al. |
| 2003/0219362 A1 | 11/2003 | Whittenberger |
| 2005/0211100 A1 * | 9/2005 | Doughty et al. ............ 96/154 |
| 2006/0019827 A1 | 1/2006 | Whittenberger |
| 2006/0230613 A1 | 10/2006 | Whittenberger et al. |

OTHER PUBLICATIONS

International Search Report and Written Opinion issued in International Patent Application No. PCT/US2012/061003, Mar. 4, 2013.

* cited by examiner

MONOLITH WITH CATALYTIC OR SORBENT BEADS

FIELD OF THE INVENTION

The invention relates to monoliths having attached thereto catalytic beads or sorbent beads, for catalytic or sorbent purposes.

BACKGROUND OF THE INVENTION

Ceramic bead catalysts in a packed bed have been used for many years for a variety of reactions, including steam reforming of methane, reforming of methanol, conversion of CO to $CO_2$, water-gas shift, or oxidation of methanol to form formaldehyde, and oxidation of ethylene to form ethylene oxide. Packed bed catalyst designs are also used in some pollution control applications. Packed bed catalyst designs have always been negatively affected by pumping losses caused by pressure drop as the liquid or gas fluid flows through the packed bed.

Some of these packed bed reactions (for example, steam reforming of methane) mitigate the pressure drop problem by using large beads in the packed bed, ie, 10 mm or more. Less surface area, and sometimes less heat transfer is available with larger beads, but these reduced properties are acceptable in some cases. Other packed bed reactions cannot operate effectively without the properties of the smaller beads, with characteristic size of 6 mm or less.

It is also known to use beds packed with sorbent beads. Such packed beds will absorb or adsorb a particular species of gas or liquid from a mixture that is passed through the bed. Such beds also sometimes require small beads to operate effectively.

All such packed beds can be characterized as random or loose packed, with associated un-ordered or turbulent flow of gas or liquid through the bed. One problem with loose or random packed beds is that, when the metal container or enclosure surrounding the ceramic beads or media cools and contracts, the ceramic beads or media may be compacted, crushed, cracked or flaked, causing degradation of the beads or media, and the resulting powder/flakes tends to clog the bed.

Catalytic monoliths for reaction purposes are also known wherein a metallic foil is coated on both sides with an appropriate catalyst; one or more pieces of coated foil are then secured together to form the monolith; see, eg: U.S. Pat. Nos. 7,320,778 and 7,077,999. However, coating the foil with catalyst is an expensive and difficult task. There is a need for a simpler, less expensive, more effective way to achieve catalytic reactions and sorbent separations using catalytic or sorbent beads.

SUMMARY OF THE INVENTION

A monolith for catalytic or sorbent purposes is provided. The monolith comprises a substrate sheet having attached thereto a plurality of catalytic or sorbent beads, each bead having a diameter of at least fifty microns. Each bead has catalytic or sorbent material on an exposed surface of the bead. The substrate sheet at least partially defines one or more channels through the monolith. The channels are effective to permit a fluid to contact the beads when the fluid flows through the channel.

DETAILED DESCRIPTION OF PREFERRED EMBODIMENTS OF THE INVENTION

When a range, such as 5-25, is given, this means preferably at least 5 and, separately and independently, preferably not more than 25.

Figure 1:
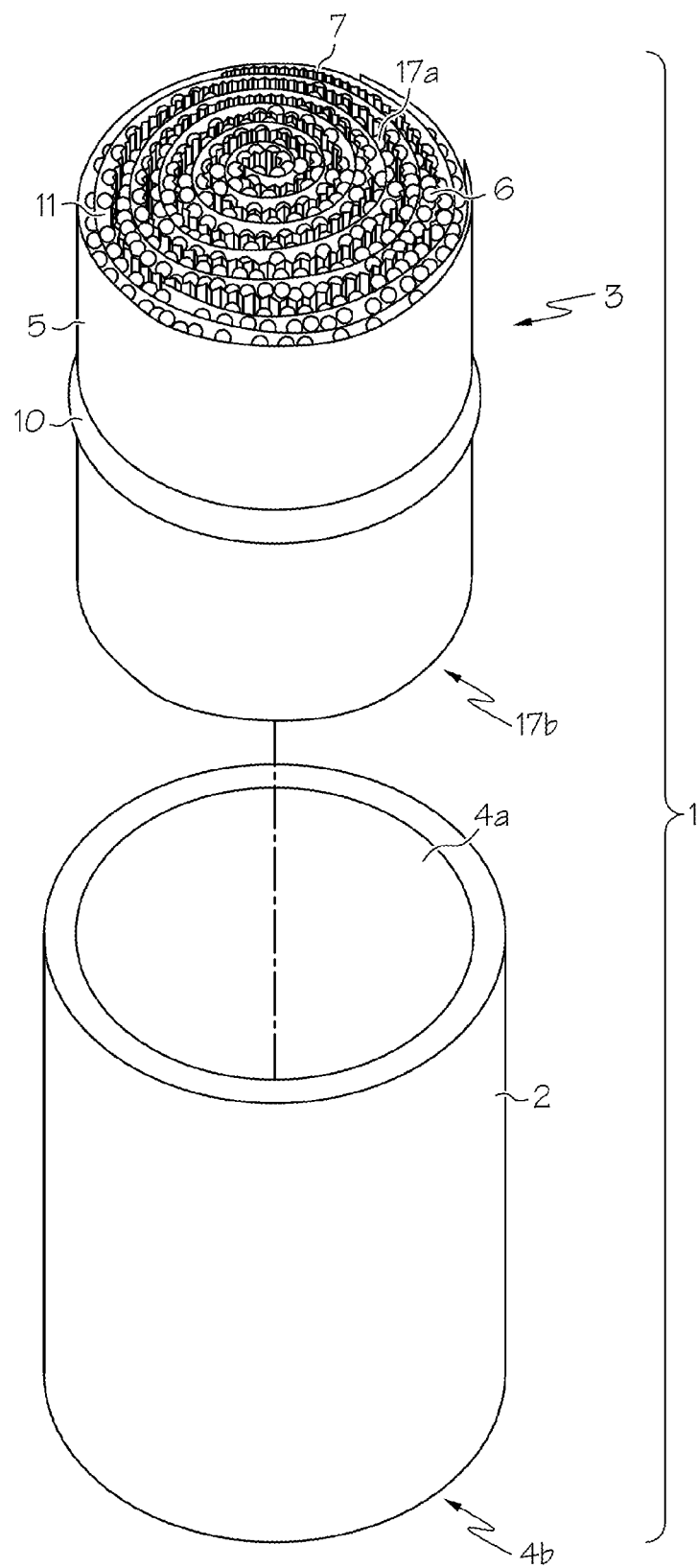
FIG. 1 shows a monolith 3 according to the invention and a tube or enclosure 2 into which the monolith can be inserted.

FIG. 1 shows schematically a reactor or enclosed monolith 1 comprising a monolith 3 to be positioned inside a reactor body or tube or enclosure 2 having an opening or inlet 4a and a corresponding opening or outlet 4b. Tube 2 can be much longer; tube 2 can hold a single monolith 3 or a plurality of monoliths 3 stacked one atop the other inside the tube 2.

As known in the art, the monolith 3 will be placed or slid into or located within the tube 2 so that fluid (such as gas or liquid) to be reacted or sorbed will enter the monolith 3 at end 17a, flow through the channels 11 through the monolith and exit the monolith at end 17b.

The tube 2 is generally as known in the art. It is preferably made of metal, such as steel, stainless steel, aluminum or Inconel; alternatively (and preferably if the reaction is a low temperature reaction like CO to $CO_2$) made of polymeric or plastic material. It is preferably a tube having a circular, rectangular, oval, or other cross-section. Its diameter (or length of side, if rectangular) is preferably at least 5, 8, 10, 15, 20 or 25 cm; its diameter (or length of side, if rectangular) is preferably not more than 90, 70, 60, 50, 40, 30, 25, 20, 15, or 12 cm. Alternatively, the tube 2 can have a rectangular cross section of not more than 3, 6, 8, 10, 15 or 20 m on each side or can have a circular cross section with a diameter of not more than 3, 6, 8, 10, 15 or 20 m. The length of the tube 2 is preferably at least 2, 4, 6, 10, 20, 40, 80, 150 or 300 cm and preferably not more than 600, 500, 400, 300, 200, 100 or 50 cm.

FIG. 1 shows a monolith 3 comprising a substrate sheet 5 having attached thereto a plurality of catalytic or sorbent beads 6. Substrate sheet 5 and separator sheet 7 (described later) can be spirally wound together to form the monolith 3 and are held together by a surrounding band (or wire) 10, preferably thin and flat and metal or plastic or polymeric. Alternatively, the spiral can be held together by welding, clips, or other fasteners or fastening means known in the art. The spiral winding defines one or more channels 11 (between the sheets 5 and 7) so that fluid can flow in one end 17a of the monolith, through the channel(s) 11, and out the other end 17b of the monolith.

Figure 7:
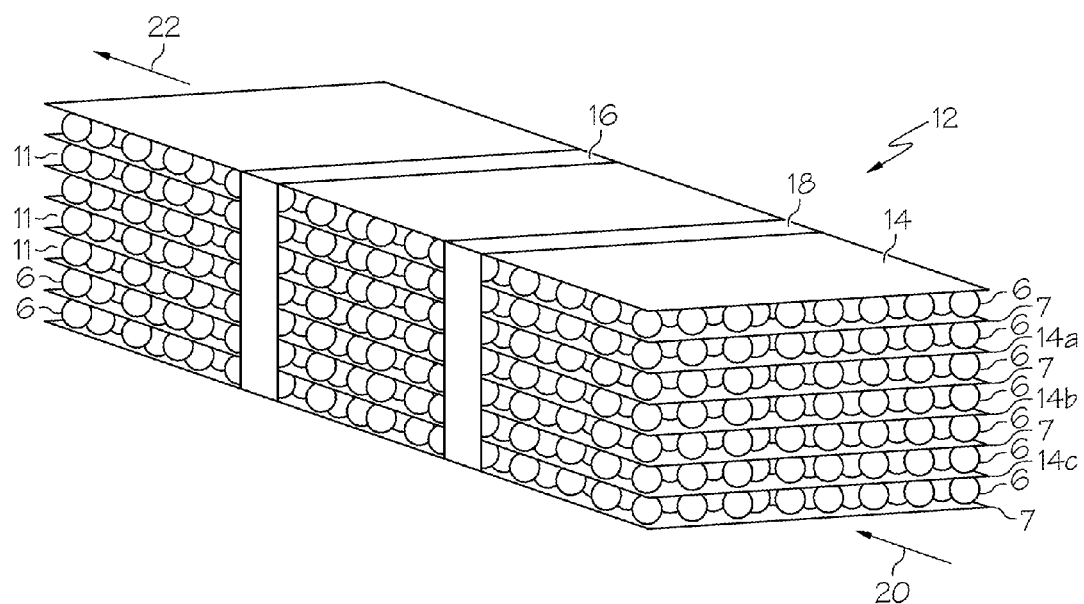
FIG. 7 shows an alternative embodiment of a monolith according to the invention wherein flat substrate sheets are stacked together.

FIG. 7 shows an alternative embodiment of a monolith according to the invention wherein separate flat layers are stacked on top of each other. Monolith 12 comprises a substrate sheet 14 to the bottom surface of which are attached a plurality of catalytic or sorbent beads 6. As shown, beads 6 are also attached to the top and bottom surfaces of flat substrate sheets 14a, 14b and 14c. Sheets 14, 14a, 14b and 14c are the same as substrate sheet 5. Several flat or corrugated separator sheets 7 are interleaved to help define channels or flow channels 11 between sheets 7 and 5. Of course, the beads 6 are located in the flow channels. Metallic or plastic bands 16, 18 hold the sheets together to form the monolith. Alternatively, the loose stack can be held together by other means, such as a surrounding enclosure with 2 open ends. When the rectangular monolith 12 is slid into the rectangular cross section tube 2, the liquid or gas fluid can flow through the monolith such as by flowing through the channels 11 in the direction from arrow 20 to arrow 22.

As known in the art, the monolith 3, 12 preferably has outside lateral dimensions so that it will fill the cross-sectional area of the reactor body or tube or enclosure 2. The monolith preferably has a circular, rectangular or oval cross-section. Its cross-sectional diameter (if circular) or length of side (if rectangular) is preferably at least 5, 8, 10, 15, 20 or 25 cm and preferably not more than 240, 120, 90, 70, 60, 50, 40, 30, 25, 20, 15 or 12 cm. For example, a rectangular monolith as shown in FIG. 7 can be made with cross-section of 30 cm by 120 cm or 60 cm by 60 cm, to form "bricks". The bricks can then be stacked up, for example, in a grid structure having vertical, horizontal, and/or diagonal support members, to hold the bricks in a large air stream tube having, for example, a 10 m×10 m cross section. The monolith (and accordingly, the flow channel 11) preferably has a length of at least 2, 4, 6, 8, 10, 14, 18, 20, 25 or 30 cm and preferably not more than 60, 50, 40, 30, 25, 20, 18, 14 or 10 cm. Typically, 1, 2, 3, 4, 5, 6, 7, 8, 9 or 10 or more monoliths will be stacked in a row, one after the other, inside the tube 2, with all the flow channels 11 aligned so that a single portion of fluid can flow through all the monoliths in the tube 2.

Figure 2:
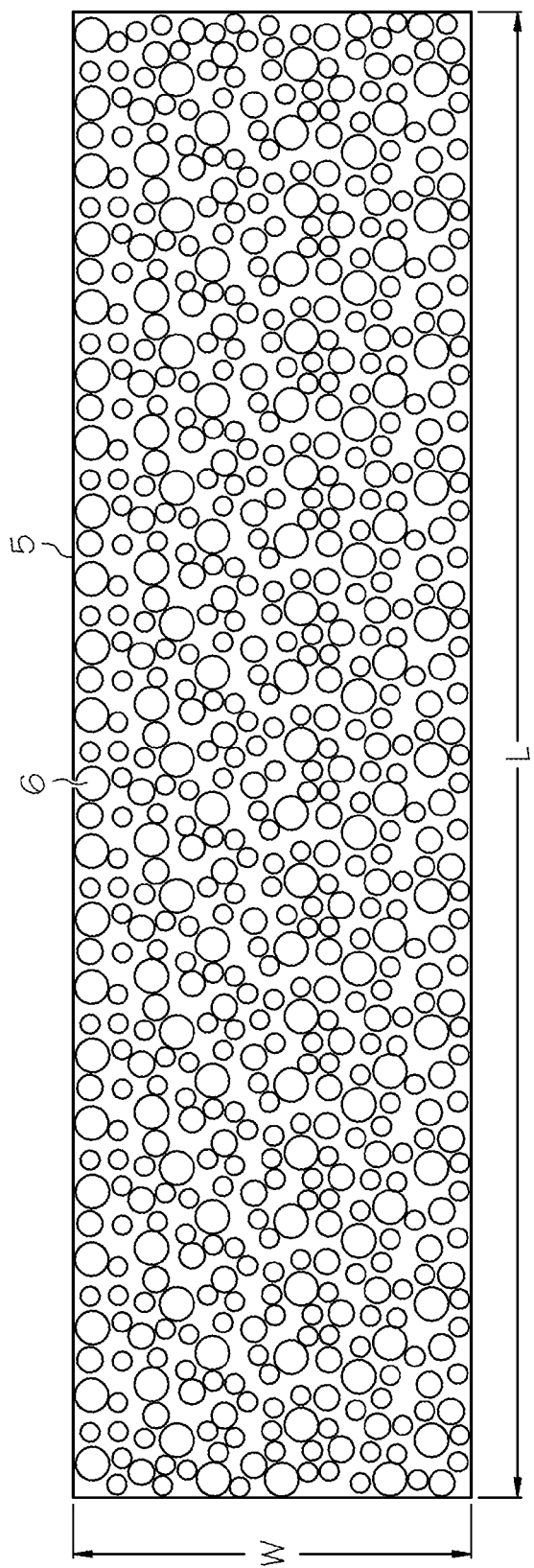
FIG. 2 shows a view of a top surface of a substrate sheet 5 with catalytic or sorbent beads 6 attached thereto.
Figure 3:
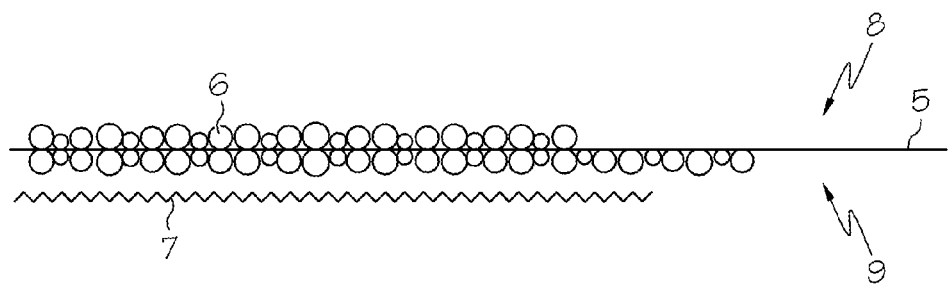
FIG. 3 shows a side view of a substrate sheet with catalytic or sorbent beads attached to the top and bottom surfaces, and an adjacent separator sheet prior to the formation of the monolith.

As shown in FIGS. 2 and 3, catalytic or sorbent beads 6 are attached to the top surface 8 and/or bottom surface 9 of substrate sheet 5. As shown in FIG. 3, beads are preferably not attached to a terminal portion of the top and bottom surfaces of sheet 5 so that, when the spiral is made, there is less of a gap between the outside of the monolith 3 and the inside of the tube 2 (see FIGS. 5 and 6).

Substrate sheet 5 is preferably a thin sheet or foil, such as 0.001-0.010 inches thick, of metal, preferably steel, stainless steel, aluminum, Inconel, or Fecralloy, or plastic or polymer (polyester, polyethylene, polyvinylchloride, etc.) or paper, stiff paper, thick paper or thin cardboard. Alternatively, sheet 5 can be double sided or single sided adhesive tape, or single sided or double sided aluminum adhesive tape. The length of sheet 5 is long enough to provide the desired cross-sectional diameter or side; the width of sheet 5 is sufficient to provide the desired length of flow channel 11.

Beads 6 can be catalytic beads to catalyze reactions, such as reforming of methanol, conversion of CO to $CO_2$, water-gas shift, oxidation of methanol to formaldehyde, converting ozone to oxygen, oxidation of hydrocarbons, oxidation reactions for emission control, and reduction of $NO_x$.

Beads 6 can be sorbent beads to absorb or adsorb a particular species of gas or liquid from a mixture, for example sorbing $CO_2$ or $SO_x$ or $NO_x$ from a gas or exhaust gas, separating $CO_2$ or sulfur compounds or heavy hydrocarbons from natural gas, separating $CO_2$ or hydrogen or other gases from syngas, or separating steam and water from a gas stream.

Preferred catalytic or sorbent beads to perform these functions are known in the art and are available from catalytic and sorbent bead manufacturers and distributors, such as: Sud-Chemie AG, headquartered in Munich, Germany (www.sud-chemie.com), BASF Corporation, Florham Park, N.J. and BASF SE, Ludwigshafen, Germany (www.basf.com); Johnson Matthey PLC, London, England (www.matthey.com); UOP LLC, Des Plaines, Ill. (www.uop.com); W.R. Grace & Co., Chicago, Ill. (www.grace.com); and Molecular Products Limited, Essex, United Kingdom (www.molecularproducts.com). The catalytic and sorbent beads supplied by these entities can be used in the invention and are hereby incorporated herein by reference. Zeolite beads can be used. Catalytic and sorbent material is known in the art and can include nickel, palladium, platinum, zirconium, rhodium, ruthenium, iridium, cobalt and aluminum oxide.

Beads 6 are preferably spherical or spheroidal or substantially spheroidal or roughly or somewhat spheroidal or roundish or misshapen spheroids or elliptical, oval or non-uniform or shaped bodies like pellets, granules, gravel, pebbles or stones, such as pebbles found on beaches or in stream-beds. Beads 6 are preferably shaped like the catalytic and sorbent beads available from the manufacturers listed above. Beads 6 can also be cylindrical or other shapes.

As used herein and in the claims, the diameter of a bead is the average of 20 diameters taken or measured at 20 different equally spaced (from an angular perspective) points or locations around the bead. Beads 6 have a diameter of preferably at least 50, 100, 200, 300, 400, 500, 600, 800, 1000, 1500, 2000, 3000, 4000, 5000, 6000, 7000, 8000, or 9000 microns and preferably not more than 10000, 9000, 8000, 7000, 6000, 5000, 4000, 3000, 2000, 1500, 1000, 800, 600, 500, 400, 300 or 200 microns. The beads 6 are preferably ceramic or inorganic material, or plastic or polymeric, preferably porous, less preferably non-porous, preferably coated with catalytic or sorbent material (or with catalytic or sorbent material throughout). The catalytic or sorbent material is preferably on an exposed surface of the bead as known in the art.

The beads 6 are attached to substrate sheet 5 preferably by adhesive or organic adhesive (containing organic or polymeric compounds) or adhesive composition or bonding agent, such as glue, rubber cement, contact cement, contact adhesive, pressure sensitive adhesive, glue stick, single or double sided adhesive tape (stuck to sheet 5), polymeric adhesive or cement, epoxies, silicone cement, polymeric resin bonding agents, etc. For higher temperature applications, high temperature ceramic adhesives and pastes and high performance epoxies (bonding agents), such as from Aremco Products Inc., Valley Cottage, N.Y. 10989 (www.aremco.com) can be used. Alternatively, a catalyst washcoat as known in the art (or a known washcoat slurry without catalyst powder) can be applied to the sheet 5 and, while it is still wet and before it is dry, the beads 6 can be applied and stuck to the sheet 5.

The beads 6 are preferably all the same shape and diameter and size; less preferably different size beads 6 can be mixed together. Preferably, the beads 6 are packed adjacent one another as much and as tightly as possible, so that the beads overshadow a maximum percentage of the underlying substrate sheet 5. Less preferably the beads 6 can be spaced apart from one another so that they overshadow at least 5, 10, 20, 30, 40, 50, 60, 70, 80, 90, 95, 98 or 99% of the maximum percentage mentioned above.

For efficiency, different catalytic and sorbent reactions and processes are carried out at different preferred temperatures. Accordingly, the sheet 5, beads 6, separator sheet 7 and adhesive or bonding agent or adhesive composition are selected based upon what environment (temperature, pressure, velocity, gas or liquid composition) they will experience. The sheet 5, beads 6, separator sheet 7 and adhesive or bonding agent are preferably those which perform effectively, or most effectively, or efficiently, or most efficiently at, and can effectively tolerate, process temperatures of at least −20, −10, 0, 4, 10, 15, 20, 25, 30, 50, 80, 100, 150, 200, 250, 300 or 350 degrees C. and process temperatures not more than 900, 700, 500, 400, 350, 300, 250, 200, 150, 100, 80, 50, 30 or 27 degrees C.

The separator sheet 7 is optional and is preferably the same material as sheet 5, and preferably the same or similar shape and size. Substrate sheet 5 is preferably substantially planar or flat, non-corrugated as shown; separator sheet 7 can be substantially planar or flat, or corrugated (as shown) or crinkled.

Figure 4:
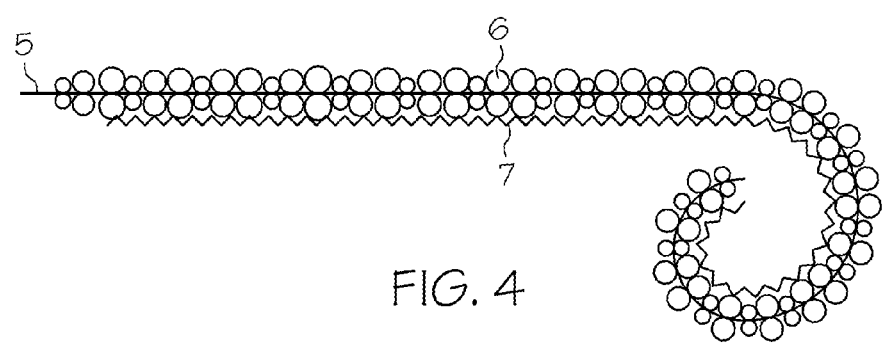
FIG. 4 shows a side view of an arrangement similar to FIG. 3, wherein the substrate sheet and separator sheet are beginning to be rolled to form a monolith.
Figure 5:
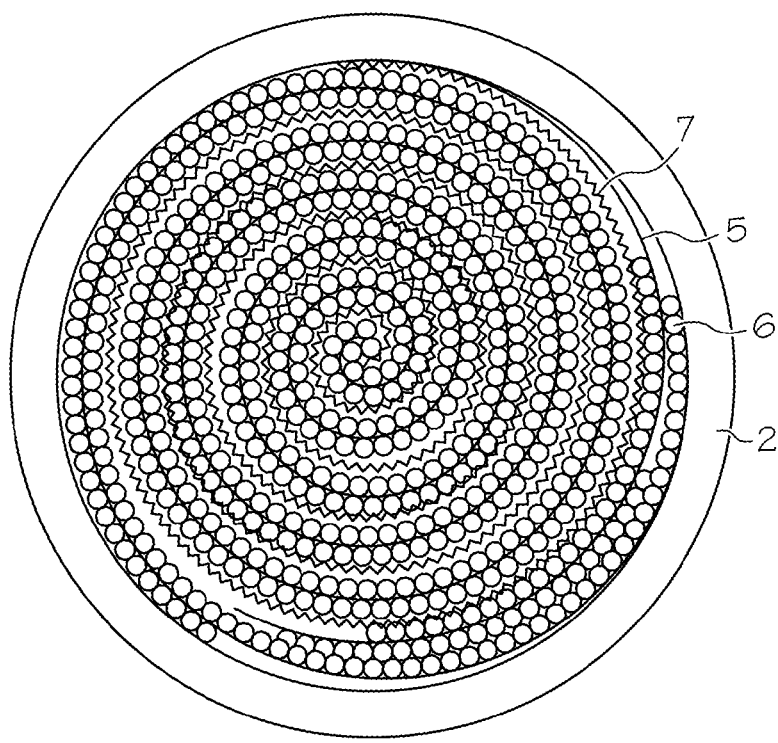
FIG. 5 shows a monolith 3 according to the invention inside a reactor body or tube.
Figure 6:
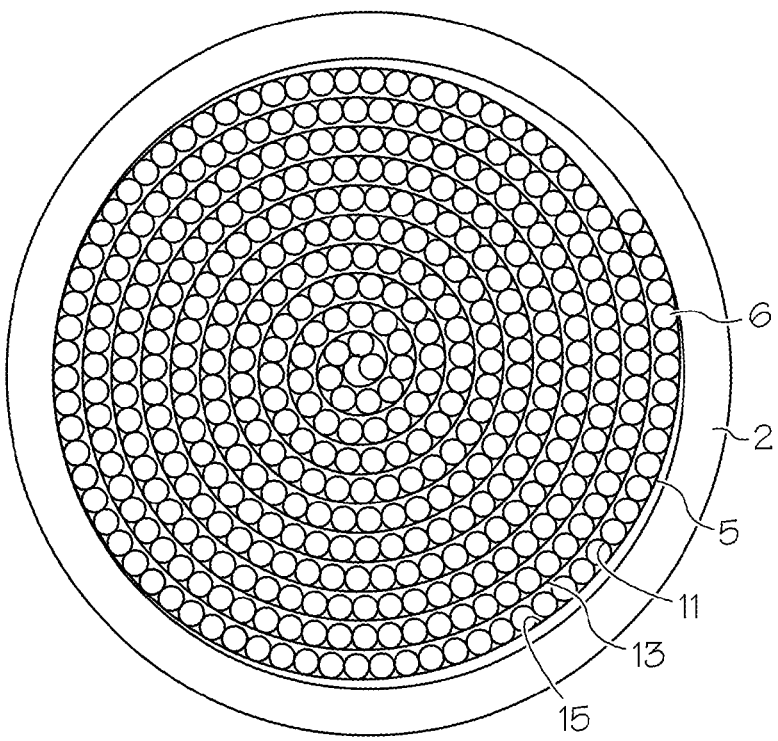
FIG. 6 shows an alternative embodiment of a monolith according to the invention inside a reactor body or tube.

As shown in FIGS. 4 and 5, sheet 5 with beads 6 on both sides can be placed next to optional sheet 7 and rolled up to provide a monolith as shown in FIG. 5. Alternatively, sheet 7 can be omitted. The separator sheet 7 keeps beads on one sheet 5 separate and apart from beads on an adjacent sheet 5 as shown; this defines more effective fluid-flow channels 11 and prevents bead-to-bead contact. When beads 6 are attached to only one side of sheet 5, the sheet 5 can be rolled up without need of separator sheet 7 (see FIG. 6). Fluid flow channels 11 are defined between adjacent sheets 5 and adjacent sheets 5 and 7. For example, in FIG. 6, fluid flow channel 11 is defined between portions 13 and 15 of substrate sheet 5. In FIG. 7, fluid flow channels 11 are defined between adjacent sheets 7, 14, 14a, 14b and 14c.

As shown in FIGS. 1, 5, 6 and 7, substrate sheets can be spirally wound or laid flat as cut sheets. Alternatively, a long substrate sheet 5 (with beads 6 attached) can be folded back and forth several or many times to define a series of adjacent flat surfaces like in FIG. 7 and sheets 7 can again be interleaved between adjacent flat segments of sheet 5 to prevent adjacent layers of beads 6 from contacting each other. In FIG. 7, substrate sheets can be stacked with or without separator sheets. Substrate sheets 5 with or without sheets 7 can be twisted, bent or otherwise configured, so long as fluid flow channels 11 are provided through the monolith.

EXAMPLE

Sofnocat 514 catalytic beads (2-5 mm diameter) from Molecular Products Limited were cemented to both sides of a flat Fecralloy foil 0.002" thick×2"×48" long using Elmer's rubber cement. This strip was mated with a herringbone corrugated Fecralloy foil (sheet 7) and spirally wound to form a cylindrical monolith about 2.75" in diameter, similar to what is shown in FIG. 5. A similar 1.85" diameter monolith was constructed by starting with shorter foils.

These monoliths were evaluated on a flow bench, comparing pressure drop against a 0.875" diameter×2" long bed packed with the same beads in the conventional manner. The 2 monoliths and the packed bed were all 2" long. CO at 10-80 ppm in nitrogen was flowed through the samples at room temperature at space velocity of 60-70000/hour. The packed bed showed conversion of CO to $CO_2$ of 80-100%, while the 2 monoliths showed conversion of CO to $CO_2$ of 50-80%. However, the pressure drop through the monoliths was about 20% of the pressure drop through the packed bed at the same velocity. While the conversion rate for the monoliths was lower, it was adequate for the intended application. But the lower pressure drop through the monoliths enabled the intended application to operate on a very low-power fan, which was not possible with the packed bed. Accordingly, the invention is effective.

To make the monolith, preferably at a temperature of 10-37° C. or 15-30° C. sheet 5 is coated with adhesive composition and beads 6 are applied so they stick. Then sheet 5 is rolled or stacked up, with or without separator sheets 7, optionally bands 10, 16, 18 are applied to hold the monolith together, and the monolith is put in the reactor body or tube or other enclosure wherein the fluid will flow. The components of the monolith are selected depending on which reaction or process is to be run and at what temperature.

Although preferred embodiments of the invention have been described, it is contemplated that modifications thereof may be made and some features may be employed without others. All such variations are considered within the scope of this invention as defined by the appended claims.

The invention claimed is:

1. A method of making a monolith for catalytic or sorbent purposes, comprising the steps of:
   (a) providing a substrate sheet having a top surface and a bottom surface;
   (b) coating both of the surfaces with an adhesive composition, wherein both of the surfaces are coated at the same location along the substrate sheet for at least a portion of the substrate sheet;
   (c) contacting both of the coated surfaces with a plurality of catalytic or sorbent beads so that the beads are attached to the substrate sheet, each bead having a diameter of at least 50 microns, each bead having catalytic or sorbent material on an exposed surface of the bead; and
   (d) providing a separator sheet to separate the catalytic or sorbent beads on adjacent coated surfaces of the substrate sheet.

2. The method of claim 1, wherein the adhesive composition being an organic adhesive.

3. The method of claim 1, further comprising spirally winding the substrate sheet of step (c) and the separator sheet of step (d) to form a monolith, the separator sheet at least partially defining one or more channels through the monolith.

4. The method of claim 3, further comprising disposing the spiral wound monolith into a tube.

5. The method of claim 1, further comprising folding the substrate sheet of step (c) and the separator sheet of step (d) back and forth to define a series of adjacent surfaces.

6. The method of claim 1, further comprising providing a plurality of substrate sheets in step (a) and a plurality of separator sheets in step (d), further arranging the plurality of substrate sheets of step (c) one adjacent the next in a stack, and further arranging the separator sheets between the adjacent substrate sheets, the separator sheets at least partially defining one or more channels through the monolith.

7. The method of claim 1, wherein the beads being catalytic beads effective to catalyze one or more reactions selected from the group consisting of reforming of methanol, conversion of CO to $CO_2$, water-gas shift, oxidation of methanol to formaldehyde, converting ozone to oxygen, oxidation of a hydrocarbon, and reduction of $NO_x$.

8. The method of claim 1, wherein the beads being sorbent beads effective to (a) sorb $CO_2$ or $SO_x$ or $NO_x$ from a gas, (b) sorb $CO_2$ or sulfur compounds or heavy hydrocarbons from natural gas, (c) separate $CO_2$ or hydrogen or another gas from syngas, or (d) separate $H_2O$ from a gas.

9. The method of claim 1, wherein the beads can perform their catalytic or sorbent function effectively at a process temperature between 4° C. and 300° C.

10. The method of claim 1, wherein the separator sheet is corrugated.

11. A monolith for catalytic or sorbent purposes, the monolith comprising:
- a substrate sheet having a top surface and a bottom surface, the top surface and the bottom surface being coated with an adhesive such that both of the surfaces are coated at the same location along the substrate sheet for at least a portion of the substrate,
- a separator sheet,
- wherein both of the coated surfaces of the substrate sheet have adhesively attached thereto a plurality of catalytic or sorbent beads at the same location along the substrate sheet for at least a portion of the substrate sheet, each bead having a diameter of at least 50 microns, each bead having catalytic or sorbent material on an exposed surface of the bead, and
- wherein the substrate sheet and the separator sheet at least partially define one or more channels through the monolith, the one or more channels being effective to permit a fluid to contact the beads when the fluid flows through the channel, and wherein the separator sheet separates the catalytic or sorbent beads on adjacent coated surfaces of the substrate sheet.

12. The monolith of claim 11, wherein each bead has a diameter of 50 microns to 10 mm.

13. The monolith of claim 11, wherein the beads are attached to the substrate sheet by an organic adhesive.

14. The monolith of claim 11, wherein the beads are catalytic beads effective to catalyze one or more reactions selected from the group consisting of reforming of methanol, conversion of CO to $CO_2$, water-gas shift, oxidation of methanol to formaldehyde, converting ozone to oxygen, oxidation of a hydrocarbon, and reduction of $NO_x$.

15. The monolith of claim 11, wherein the beads are sorbent beads effective to (a) sorb $CO_2$ or $SO_x$ or $NO_x$ from a gas, (b) sorb $CO_2$ or sulfur compounds or heavy hydrocarbons from natural gas, (c) separate $CO_2$ or hydrogen or another gas from syngas, or (d) separate $H_2O$ from a gas.

16. The monolith of claim 11, wherein the beads can perform their catalytic or sorbent function effectively at a process temperature between 4° C. and 300° C.

17. The monolith of claim 11, wherein the substrate sheet and the separator sheet are spirally wound.

18. The monolith of claim 11, comprising a plurality of said substrate sheets, each substrate sheet being substantially planar, the substrate sheets being arranged one adjacent the next in a stack, and
- a plurality of said separator sheets, wherein each separator sheet is arranged between adjacent substrate sheets.

19. The monolith of claim 11, further comprising a tube, the monolith being disposed within the tube.

20. The monolith of claim 11, wherein the separator sheet is corrugated.

21. The monolith of claim 11, wherein the substrate sheet and the separator sheet are metal.

22. The monolith of claim 11, further comprising a band for holding the monolith together.

23. The monolith of claim 11, wherein the separator sheet is not coated with catalyst or sorbent material.

24. A monolith for catalytic or sorbent purposes, the monolith comprising:
- a substrate sheet having a top surface and a bottom surface, the top surface and the bottom surface being coated with an adhesive such that both of the surfaces are coated at the same location along the substrate sheet for at least a portion of the substrate,
- a separator sheet, wherein the separator sheet is corrugated,
- wherein both of the coated surfaces have adhesively attached thereto a plurality of catalytic or sorbent beads at the same location along the substrate sheet for at least a portion of the substrate sheet, each bead having a diameter of at least 50 microns, each bead having catalytic or sorbent material on an exposed surface of the bead, and
- wherein the substrate sheet and the separator sheet at least partially define one or more channels through the monolith, the one or more channels being effective to permit a fluid to contact the beads when the fluid flows through the channel, and wherein the separator sheet separates the catalytic or sorbent beads on adjacent coated surfaces of the substrate sheet.

* * * * *